(12) United States Patent
Anantha (10) Patent No.: US 10,900,788 B2
(45) Date of Patent: Jan. 26, 2021

(54) WEARABLE NAVIGATION SYSTEM FOR THE VISUALLY IMPAIRED

(71) Applicant: Sidharth Anantha, Lexington, MA (US)

(72) Inventor: Sidharth Anantha, Lexington, MA (US)

( * ) Notice: Subject to any disclaimer, the term of this patent is extended or adjusted under 35 U.S.C. 154(b) by 74 days.

(21) Appl. No.: 16/207,943

(22) Filed: Dec. 3, 2018

(65) Prior Publication Data
US 2020/0173783 A1 Jun. 4, 2020

(51) Int. Cl.
*G01C 21/20* (2006.01)
*G06T 7/70* (2017.01)

(52) U.S. Cl.
CPC .......... *G01C 21/20* (2013.01); *G06T 7/70* (2017.01)

(58) Field of Classification Search
CPC .................................. G01C 21/20; G06T 7/70
See application file for complete search history.

(56) References Cited

U.S. PATENT DOCUMENTS

| | | | |
|---|---|---|---|
| 2013/0250078 A1* | 9/2013 | Levy | A61F 9/08 348/62 |
| 2014/0055229 A1* | 2/2014 | Amedi | G09B 21/001 340/4.1 |
| 2015/0254943 A1* | 9/2015 | Daeef | A61H 3/068 340/539.11 |
| 2016/0259996 A1* | 9/2016 | Hartley | G06K 9/00671 |

* cited by examiner

*Primary Examiner* — Thomas Ingram
(74) *Attorney, Agent, or Firm* — Wilmer Cutler Pickering Hale and Dorr LLP (57) ABSTRACT

Described herein is a system for providing range and navigation information for visually impaired persons using range finders, image recognition, and non-visual sensual signals. The system provides information about the identity and distance of objects and potential obstacles in the vicinity of the user in a non-visual form that can be perceived by a visually impaired person.

20 Claims, 10 Drawing Sheets

Amount of time Vibrator is on during on cycle for each distance measurement (1 cycle = 1000 milliseconds)

Fig. 3

Amount of time Vibrator is on during on cycle for each distance measurement (1 cycle = 1000 milliseconds)

WEARABLE NAVIGATION SYSTEM FOR THE VISUALLY IMPAIRED

FIELD OF THE DISCLOSURE

This disclosure relates to a range finding and navigation system for the visually impaired.

BACKGROUND 285 million people are legally blind worldwide. Legally blind means that one's vision is weaker than 20/200 with eyeglasses or contacts on. They may also lack depth perception, peripheral vision, or even have splotches in their vision. 39 million of these people are fully blind, meaning that their retinas are so degraded that they are unable to perceive light and create an image in their mind. There are already some solutions in place to help assist the blind, including human guides, dog guides, canes, orientation and mobility therapy, and even placement into a care facility. However, there are several flaws with these solutions, including a lack of distance perception, fatigue for the user, the fact that the solutions only report on objects at ground level, high prices, inaccessibility, a lack of portability and the fact that these solutions do not specifically tell the user what the objects in front of them are. Additionally, large aids draw attention to one's disability and exposes him/her to discrimination. In today's world, sight is crucial, and those without it experience great difficulty in their daily lives. Even with the current solutions, many still lack the ability to function independently. Furthermore, out of those who are blind, 90% are in developing nations that lack access to expensive and thorough treatment or training, and are thus left without a viable, long-term solutions. A need exists, therefore, for an advanced solution.

SUMMARY OF THE DISCLOSURE

Aspects of the invention include a system having a first range finder, a first non-visible sensual signal generator, a camera, and at least one processor. In the system, a processor is configured to receive the output from the range finder and issue a command to the non-visible sensual signal generator to produce a non-visible sensual signal representing the output from the range finder. In the system, a processor is configured to receive the output image from the camera, perform image recognition on the image, and produce a non-visible sensual signal representing the output of the image recognition.

In some aspects, the range finder is a sonar.

In some aspects, the non-visible sensual signal generator is an audible signal. generator. In other aspects, the non-visible sensual signal generator is a tactile signal generator.

In some aspects, the range finder is incorporated into an article of clothing. In some such aspects, the article of clothing is headwear or footwear.

In some aspects, the system further includes second range finder separated from the first by a distance of at least 24 inches and wherein the a processor is further configured to receive an output from the second range finder and issue a command to a non-visible sensual signal generator to produce a non-visible sensual signal representing the output from the second range finder. In some aspects, the system further includes a second processor wherein the first processor is configured to receive the output from the first range finder and the second processor is configured to receive the output from the second range finder and issue a command to a non-visible sensual signal generator to produce a non-visible sensual signal representing the output from the second range finder. In some aspects, the system further includes a second non-visible sensual signal generator that receives the command from the second processor. In aspects having a second non-visible sensual signal generator, the first non-visible sensual signal generator is an audible signal generator. In other aspects having a second non-visible sensual signal generator, the first non-visible sensual signal generator is a tactile signal generator. In some such aspects, wherein the first non-visible sensual signal generator is an audible signal generator and the second non-visible sensual signal generator is a tactile signal generator. In such aspects having a second range finder, the first and second range finder are both sonar. In such aspects having a second range finder, the first range finder is configured to be mounted on a pair of eyeglasses. In some aspects, the second range finder is configured to be mounted on a shoe.

In some aspects, the image recognition is object recognition, facial recognition, or text recognition. In some aspects, the system further includes a speaker, wherein the processor is configured to issue commands to the speaker to emit an audible display of the object, face, or text recognized by the system. In some aspects, the system includes two or more processors wherein the first processor is configured to receive the output from the range finder and issue a command to the non-visible sensual signal generator to produce a non-visible sensual signal representing the output from the range finder and the second processor is configured to receive the output image from the camera, perform image recognition on the image, and produce a non-visible display of the recognized image. In some aspects, the second processor is configured to use machine learning to perform object recognition, facial recognition, or text recognition on the images from the camera.

DETAILED DESCRIPTION

Described herein is a system having a combination of range sensors and non-visible stimulus generators to create a mental image of the blind user's surroundings. The system accomplishes this goal by using range finding to alert the visually impaired about the distance to objects in the user's vicinity. In some aspects, the device also uses machine learning and image recognition to inform the user in real time specifically what objects are present in their field of view. The system is wearable, portable and accessible, and in some aspects may be very cost effective relative to current solutions. Benefits of the system include: The ability to determine the distance between the user and an obstacle ahead, an accurate portrayal of that distance to provide a navigational sense to the user, the aspect of wearablility on the body while still moving with ease, being tactile and simple to use, and comfortable for the user to wear.

Aspects of the invention include a system having a range finder, a non-visual sensual signal generator, and a processor configured to receive input from the range finder and trigger a non-visual signal from the non-visual sensual signal generator. In some aspects, the system is wearable. Wearable means that all the individual hardware components of the system are sufficiently small, are sufficiently light weight, and are configured to be worn on a user's body without using the user's hands. In some aspects, the system includes two or more range finders where two range finders in the system are separated by at least 24 inches, but no more than 96 inches. Such separation provides the user with information from at least two different locations. In some aspects the system includes a camera in communication with a processor configured to receive images from the camera, perform image recognition on the images, and produce a non-visible sensual signal representing the output of the image recognition.

Range Finder

The range finder functions to measure the distance between the user wearing the range finder and an object in front of the user. In general, any range finder may be used that can generate an electrical output to be processed by the processor. Likewise, any range finder may be used that can measure distances at a range of 0.01 meter to about eight meters. The range finder should be sufficiently accurate within the range of 0.01 meter to about eight meters to provide sufficient information to allow the user to avoid obstacles and objects in the field of view. For example, the range finder may have an accuracy of at least 1 cm, meaning that the true distance and the reported distance differ by no more than 1 cm. The range finder may be more accurate, with an accuracy of about 0.5 cm, about 0.3 cm, or about 0.1 cm.

Figure 8:
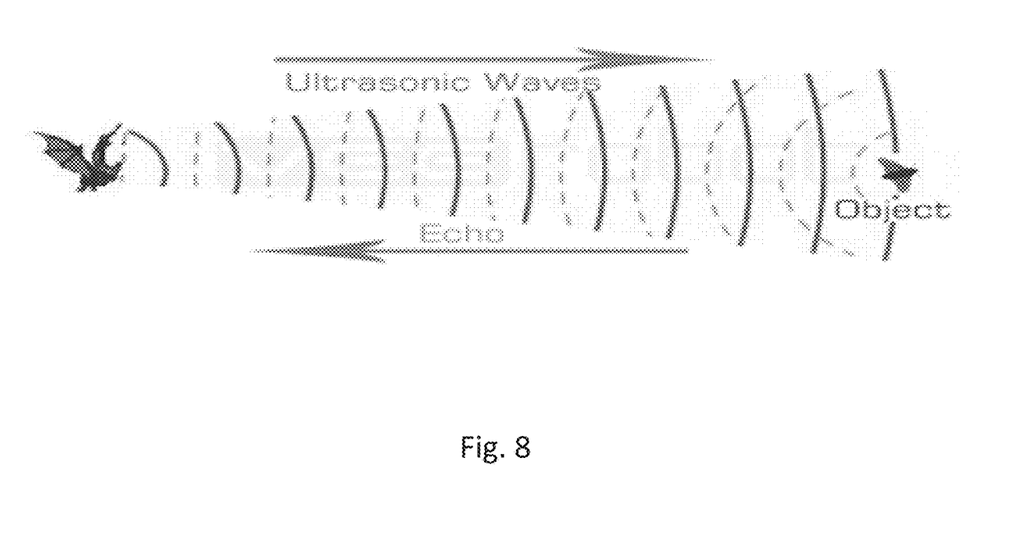
FIG. 8 shows a visualization of the principle of echolocation using ultrasonic waves.

In some aspects, the range finder may be sound-based. A sound-based range finder may be, for example, ultrasonic, sonic, or sub-sonic so long as it measures the distance with sufficient accuracy and produces a signal to be processed by the processor. Without wishing to be bound by theory, the sound-based range finder has a sound emitter and receiver. The emitter emits a sound pulse or burst and the receiver detects the echo sound or reflected sound that returns from a solid object. By measuring the time between the emitted sound and the received echo, the distance is calculated through a rate-distance-time equation. An example of this type of range finding is echolocation, the basic principles of which are illustrated in FIG. 8. In some aspects, the range finder is a sonar device. Sonar devices have the benefit of being small and inexpensive, while providing a practical range and accuracy.

In some aspects, the range finder may be electromagnetic. Electromagnetic range finders may use any kind of electromagnetic energy that can measure distances within the range of about 0.01 to about eight meters with sufficient accuracy. The electromagnetic range finder may use, for example, microwaves, infrared waves, visible light including laser-based range finders (LiDAR), or radio waves to measure the distance. Again, without wishing to be bound by theory, an electromagnetic range finder includes a transmitter and receiver. The transmitter emits electromagnetic energy and the receiver detects the electromagnetic energy that reflects off an object, from which a distance is calculated using any known technique. As before, the range finder produces an output processed by the processor.

In some aspects the range finder is wearable, meaning it is sufficiently small, sufficiently light weight, and configured to be passively carried on the user's body without using the user's hands. As such, the range finder may be configured to be worn at any point on the user's body. In some aspects, the range finder may include a strap, mount, or carrying case that can be used to affix the range finder removably to the user's body so that the user's hands remain free for other purposes.

In some aspects, the range finder is integrated with an article of clothing or apparel to be worn by the user. The specific article of clothing or apparel is not limited so long as the range finder may be integrated with it. Examples of suitable pieces of clothing or apparel include, for example, headwear such as glasses, hats, visors, necklaces/amulets/pendants or other items worn on the head or neck; bodywear such as shirts, belts, harnesses, chest or hip straps, pouches or any other item worn on the trunk, waist, hips, or upper leg; footwear such as shoes, boots, ankle straps, sandals or other items worn on the foot, ankles, or lower leg; or handwear such as gloves, bracelets, or wristbands. In some embodiments, the range finder is integrated into headwear, such as glasses, hats, or visors, to provide a measurement of objects at head-level or eye-level. In some embodiments, the range finder is integrated into footwear to provide a measurement of object at ground level.

In some aspects, the system has two or more range finders where the second range finder, like the first, produces an output that is translated by a processor into a command to produce a non-visible sensual signal. In such aspects, the range finders may be separated from one another by a distance to provide information about objects in different places or in different directions. For example, for two range finders, the two range finders may be separated by at least 24 inches, by at least 30 inches, by at least 36 inches, by at least 42 inches, or by at least 48 inches. In some aspects, because the system is intended to be worn by a person, the distance between the two range finders should be no more than 96 inches, no more than 90 inches, no more than 84 inches, or no more than 78 inches. For example, when spaced according to this aspect, one range finder may be placed near the head of the user to provide information about objects at eye level while the second range finder may be placed near the feet of the user to provide information about objects at ground level.

In aspects having two or more range finders, each range finder produces an output processed by a processor. The processor may be the same processor for all the range finders or there may be more than one processor. In some aspects, the output from each range finder may be translated by a different processor. In other aspects, some range finders may use the same processor, while other range finders' outputs are processed by different processors.

Figure 2:
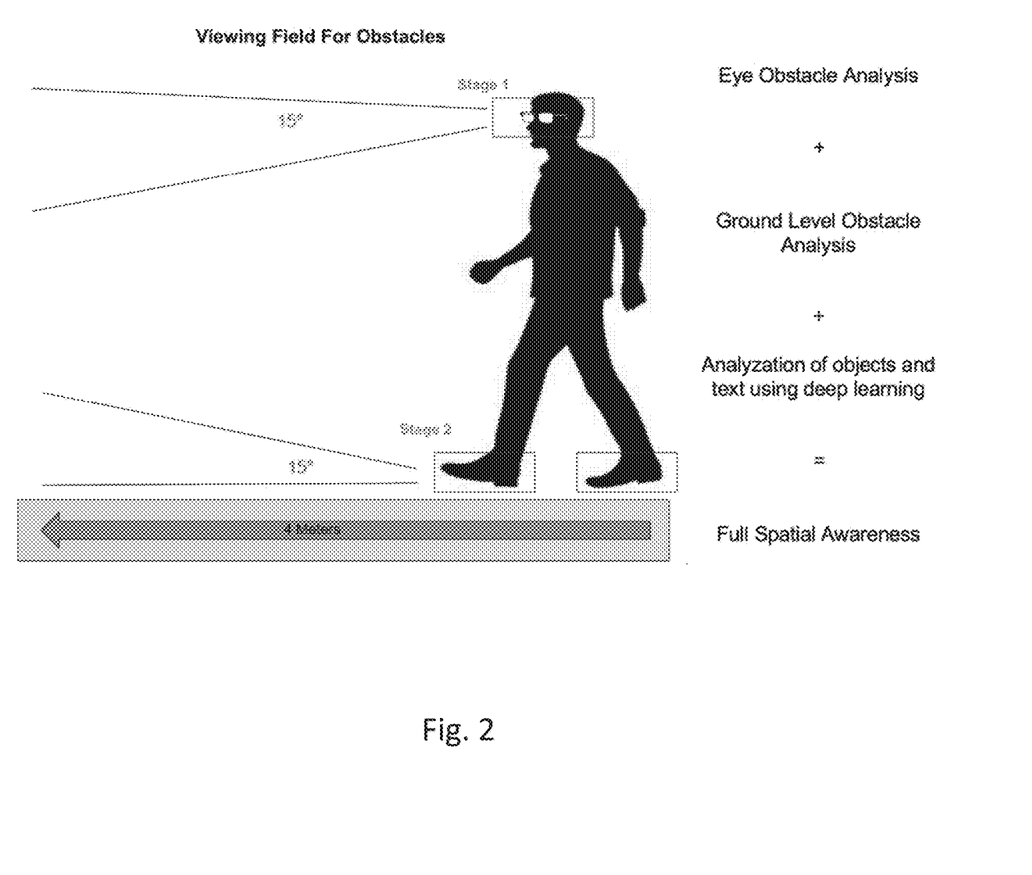
FIG. 2 shows a representation of one embodiment of the system.

In aspects having spaced range finders, for example, one range finder may be positioned at the level of the eye or head to provide information about objects at eye-level or head-level, while simultaneously a second range finder is positioned near the ground to provide information about objects at ground level. This aspect of the system is illustrated in FIG. 2, which shows a system with a range of about four meters having three range finders (located within the boxes) positioned at the head and on each foot. As also shown in FIG. 2, for example, one range finder may be incorporated into a piece of headwear, such as a pair of glasses, while another is incorporated into a piece of footwear, such as shoes. In other aspects, the two range finders may point in different directions to provide information about objects in front of, behind, or to the side of the user simultaneously. For example, two range finders may be mounted pointing to either side of the user to provide information about objects in the user's peripheral vision.

In some aspects, the range finder is mounted on a swivel, or may be attached to a servo motor to move or scan the range finder across a range of orientations. When worn on the head or hands, the direction the range finder points may be easily modified by turning the head or pointing with the hand in any given direction. Turning the head is very natural for those who are blind after birth, meaning that they are already in the habit of using moving their head for eyesight. This aspect is likely to be especially intuitive for this particular group of people.

In some aspects, the system also includes an accelerometer. The accelerometer measures when a ground level range finder is in motion. Using the accelerometer, the system may adjust the reading of the range finder to account for the movement when the movement could cause imperfect measurements. In other aspects, the system may disregard a reading from a moving range finder if the accelerometer indicates that the range finder is moving too quickly to provide an accurate reading.

Figure 9:
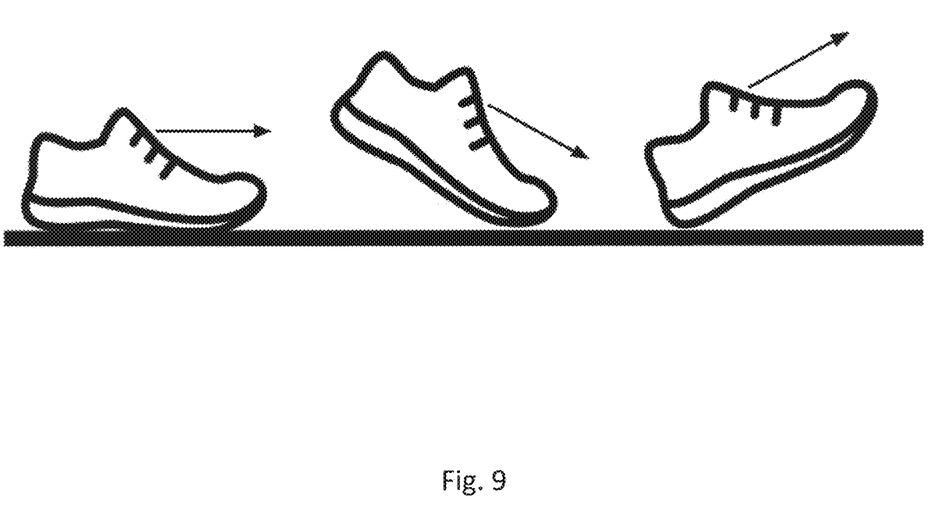
FIG. 9 shows an illustration of an embodiment of the system using an accelerometer or gyro sensor.

In some aspects the system also includes an orientation sensor, such as a gyro sensor. The orientation sensor measures the orientation of the range finder and can be used to determine when a range finder is pointing in the wrong direction. As illustrated in FIG. 9, for a range finder mounted on a shoe, foot or leg, whenever the user takes a step, the range finder may no longer point in a forward direction. Using a gyro sensor, the system may disregard readings when a range finder is pointing toward the sky or toward the ground to avoid producing anomalous results. Alternatively, using the angle measured by the orientation sensor in combination with the distance measured by the range finder when the range finder is not pointed directly forward, the system can compensate and calculate the true horizontal distance using simple trigonometry.

Non-Visual Sensual Signal Generator

The system includes a non-visible sensual signal generator that produces a non-visible sensual signal perceivable by the user. Because the user is visually impaired, visible readouts from the range finder are useless. In some aspects, the system lacks any visual readout from the range finder at all. Instead, the system uses non-visible sensual signals to provide information to the visually impaired user.

The non-visible sensual signal generator is controlled by the processor, which triggers the non-visible sensual signal generator to produce a non-visible sensual signal according to the distance/non-visible signal correlations defined and stored in the processor.

Figure 6:
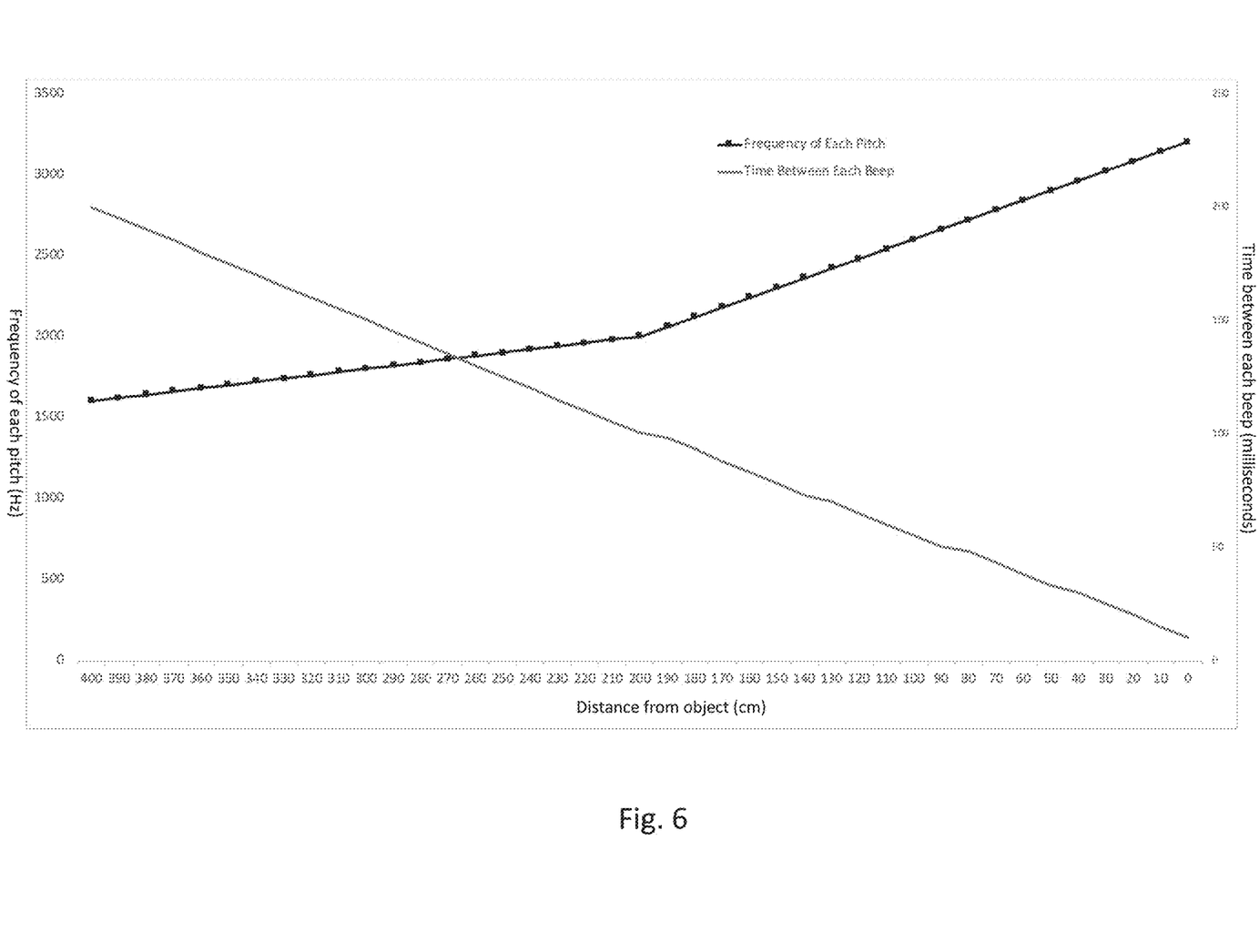
FIG. 6 shows graphs representing auditory outputs according to an embodiment of the system.

In some aspects, the non-visible sensual signal may be an audible signal. In such aspects, the system may include a speaker that emits an audible signal. The speaker may be incorporated into, for example, a pair of headphones, or may be independent. The audible signal produced is controlled by the processor to correspond to the output of the range finder or range finders. The audible signal can, for example, correlate distance to sound frequency or pitch. For example, a closer object may produce a higher pitch, whereas a more distant object may produce a lower pitch, as illustrated in FIG. 6, represented by the black line. Alternatively, a closer object may produce a lower pitch, whereas a more distant object may produce a higher pitch. The audible signal can, for example correlate distance to a period of repetition. In such aspects, the audible signal includes a repeating sound where the interval between repetitions changes with distance. For example, the repeating sound may repeat more frequently for an object that is closer or repeat less frequently for an object that is further away, as illustrated in FIG. 6, represented by the gray line. Alternatively, the repeating sound may repeat less frequently for an object that is closer and repeat more frequently for an object that is further away. In other aspects, the audible signal may correlate the distance to the length of the tone. For example, the length of the tone may be longer for an object that is closer and shorter for an object is further away. Alternatively, the length of the tone may be shorter for an object that is closer and longer for an object that is further away. All of the above signals can be combined to provide complex positional information about an object or objects. In other aspects the audible signal may include emergency proximity warnings for objects that are very close or moving quickly.

In some aspects, the audible signal generator may be incorporated into an article of clothing to be worn by the user. For example, a single earpiece may be used to allow the user to hear the surroundings and still perceive the audible signals produced by the system. Alternatively, the audible signal generator may be headphones or even speakers, so long as the user can hear the signals produced.

Figure 3:
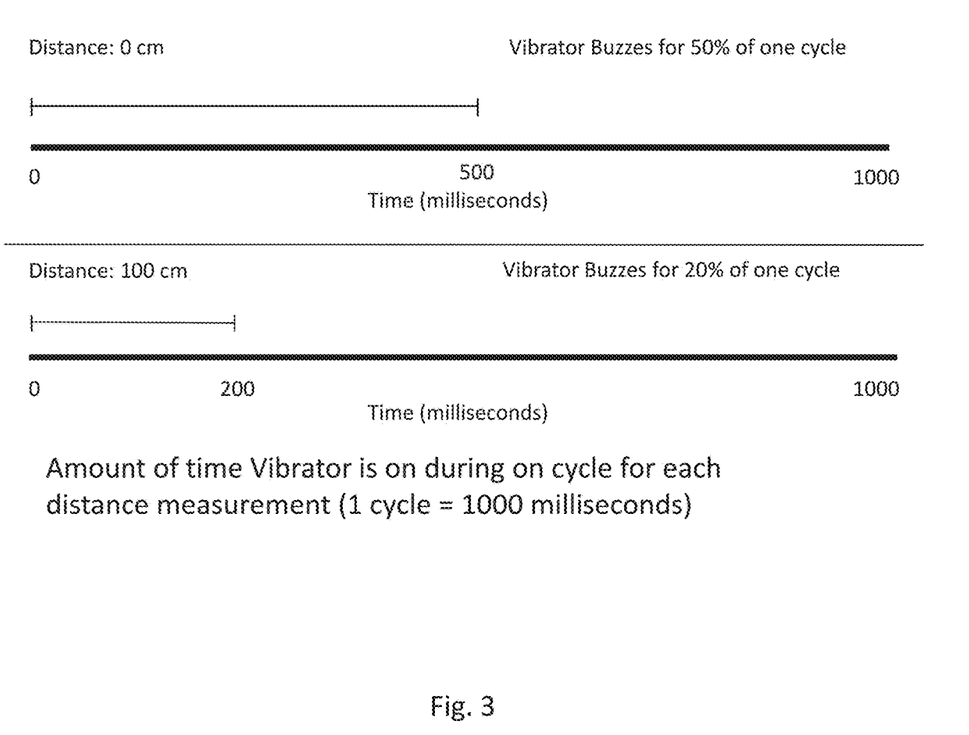
FIG. 3 shows an embodiment of the system correlating distance and vibration repetition.
Figure 4:
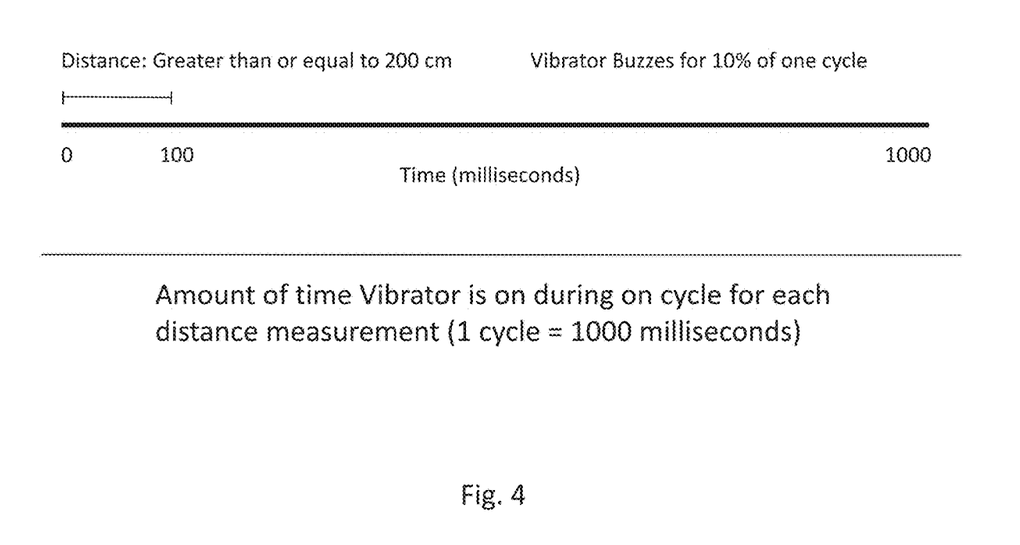
FIG. 4 shows an embodiment of the system correlating distance and vibration repetition.
Figure 5:
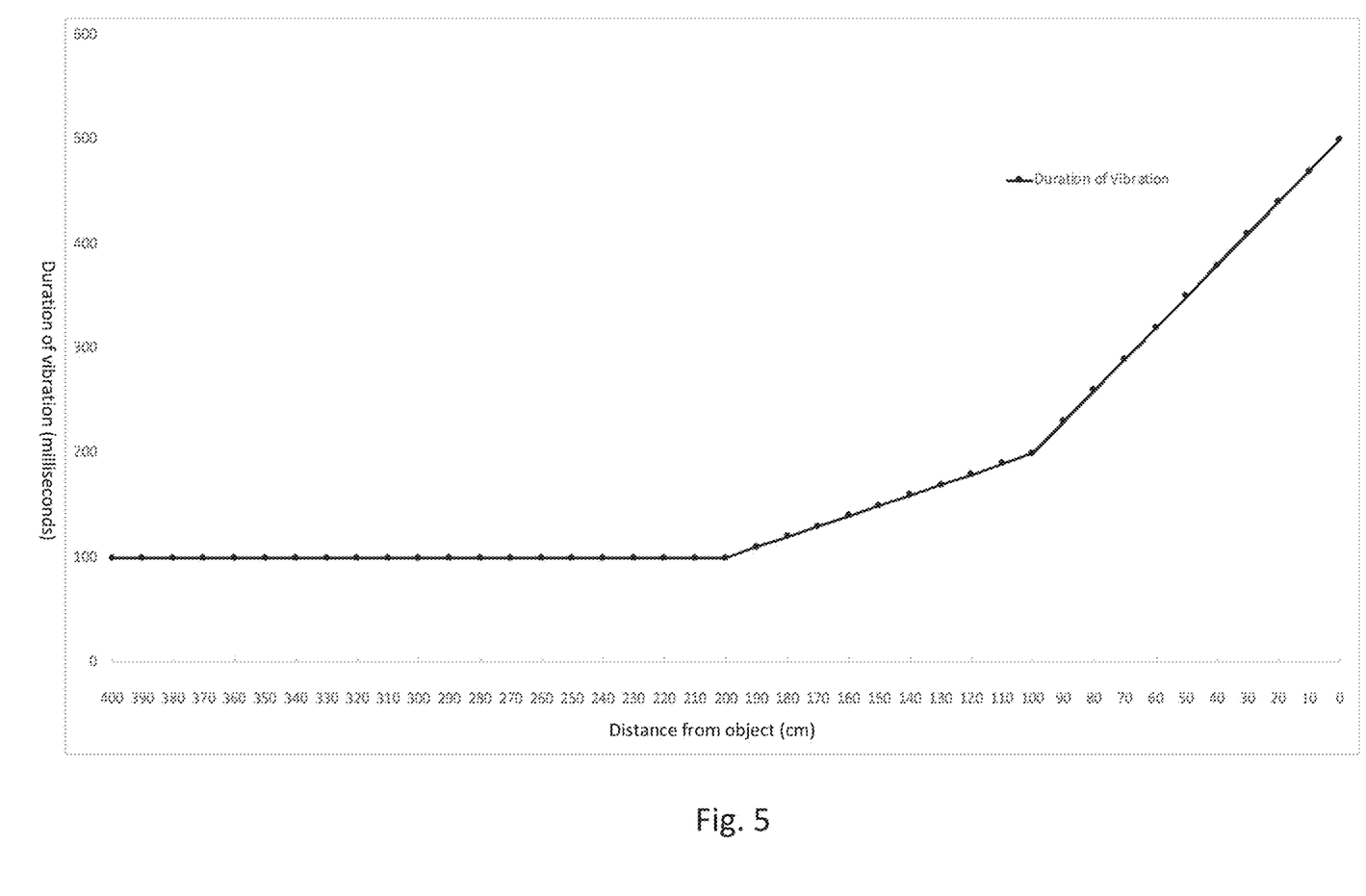
FIG. 5 shows a graph demonstrating an embodiment of the system where the rate of change increases as distance decreases.

In some aspects, the non-visible sensual signal is a tactile signal. The tactile signal generator is controlled by the processor according to a program to correlate distance to a specific tactile signal. In general, a tactile signal may be produced by a vibration motor or tapping device, or any other mechanical device that touches a surface of the user's skin so that the user can feel the tactile signal created by the tactile signal generator. In some aspects, using a vibrating motor, the system may correlate the distance to the repetition of the vibration. For example, the vibration may be more frequent when an object is closer, and less frequent when an object is further away. Alternatively, the tactile signal may repeat less frequently for an object that is closer and repeat more frequently for an object that is further away. Alternatively, in some aspects using a vibrating motor, the system may correlate the distance to the duration of the vibration. For example, the vibration may be longer when an object is closer, and shorter when an object is further away. For example, as illustrated in FIG. 3 and FIG. 4, the duration of the vibration is represented as a percentage of a 1000 millisecond cycle and the duration of the vibration decreases as the distance increases. FIG. 5 is a graphical representation of the embodiment illustrated in FIG. 3 and FIG. 4, across a range of distances. Alternatively, the vibration may be shorter when an object is closer, and longer when an object is further away.

In some aspects, the tactile signal generator includes multiple tactile signal generators in an array to correlate the distance to a pattern produced by the array. For example, the pattern may be a line, circle, square, box or other shape, giving a wide range of different tactile combinations. The specific pattern is controlled by the processor according to a program to correlate distance to specific patterns.

The tactile signal generator may be placed in contact with the user's skin, either directly or through clothing, so long as the user may perceive the tactile signal produced. In some aspects, the tactile signal generator is placed at the hip, though it may be placed anywhere above the hip, below the hip, on the arm, wrist, back of the hand, or any other position with sufficient sensitivity to discern the signals produced.

In aspects having more than one range finder, there may be multiple audible signal generators, multiple tactile signal generators, or a combination of audible and tactile signal generators, so long as each produces a different signal. In some aspects, there is one non-visual sensual signal generator for each range finder in the system. In such aspects, each range finder may produce a different signal in each non-visual sensual signal generator so that the user may distinguish one from another. However, with tactile signal generators, different range finders may produce the same signals, so long as the tactile signal generators are worn in different places.

In some aspects, the non-visual sensual signal generator produces a more intense signal with closer proximity to emphasize the need for potentially urgent action. For example, as an object gets closer, an audible signal may increase in pitch, volume, or repetition. A tactile signal may, for example, increase in vibration frequency or intensity as distance decreases, especially as objects get very close to the user.

In some aspects, the rate of change in the non-visual sensual signal is higher for objects that are closer to the user and the rate of change in the non-visual sensual signal is lower or even zero for objects that are more distant. This is useful because a larger interval will highlight the change in distance for an object that is close to the user. For example, as illustrated in FIG. 5, for a non-visual sensual signal created by a vibration motor, the duration of each vibration may remain constant for objects more than 200 cm away from the user, but the duration of each vibration increases as the object gets closer between 100 cm and 200 cm away from the user. Once the object is less than 100 cm away, the rate of change increases faster as the object gets closer. The same principle applies to any non-visual sensual signal, and the rate of change may increase at different distances.

Processor

The processor receives the output from the range finder and converts the range finder output into an appropriate command to trigger the non-visual sensual signal generator to produce a non-visual sensual signal according to a program. The type of non-visual sensual signal produced is based on pre-defined correlations between the range finder output and non-visible sensual signals, which may be stored in a memory accessible by the processor.

Any sort of processor may be used that can receive input from the other components of the system and translate that into an output signal that triggers the non-visual sensual signal generator to produce a non-visual sensual signal. The processor may be a microprocessor, or central processing unit (CPU) or any other type of processor that can achieve the functions described herein. The processor may be part of an integrated circuit system, such as a microcontroller, examples of which include microcontrollers made by Arduino. The processor may be part of a computer, such as a microcomputer, that includes a processor, memory, input/output circuitry, and operating system. Any type of computer and operating system may be used that has enough processing capability and sufficiently small size to achieve the functions of the systems described herein. For example, computers such as the Raspberry Pi (RPi) developed by the Raspberry Pi Foundation and sold by Raspberry Pi (Trading), Ltd. may be used.

Figure 7:
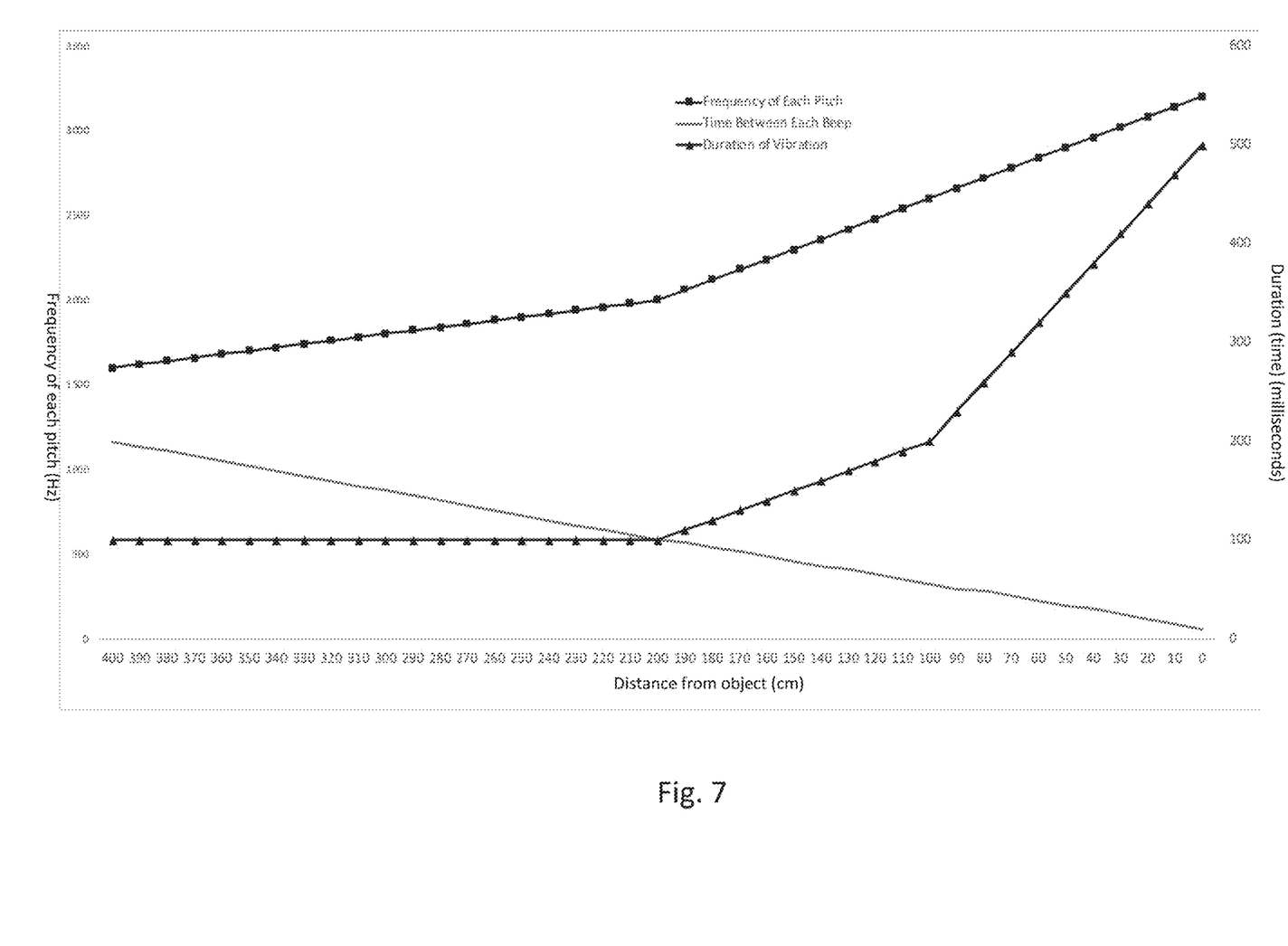
FIG. 7 shows graphs of combined vibrational and auditory outputs according to an embodiment of the system.

Translation of the distance measured by the range finder (or the electrical output produced by the range finder) to the command for the non-visual sensual signal generator may be achieved in any way known in the art including, for example, a lookup table, mathematical function, input-output function, or other software algorithms. For example, in some aspects, the system uses three parts: the input, the processor and the output. In the input, the range finding device determines the time it takes for a sound wave to travel to and from an object. This time measurement is sent to an Arduino microcontroller that includes a processor. The processor converts the time measurement into a distance measurement using the speed of sound (rate-distance-time equation). With this, the Arduino will the input the distance into a linear piecewise equation that will take the distance measurement and correspond it to an output that is received by the given non-visual sensual signal generator. For example, three equations that can be used to translate the distance into a non-visible sensual signal are shown graphically in FIG. 7 for both vibration and audible sensual signal generators. For the line representing a tactile signal correlating the duration of the vibration to distance, the Y-axis on the right represents the duration of the vibration. For the line representing an audible signal correlating the time between each beep to the distance, the duration on the Y-axis on the right represents the duration of the interval between each sound. Once the output of the mathematical function is determined, the output will be sent to the non-visual sensual signal generator to be transmitted to the user. The different ways a distance measurement can be correlated to a non-visual sensual signal have been described previously. All those variations can be implemented by changing the equations that correlate the distance measured by the range finder to a non-visual sensual signal produced by the non-visual sensual signal generator.

In some aspects, the system may include a memory accessible by the processor to store the program used to translate the output from the range finder to the command for the visual sensual signal generator. In some aspects, the system may include power storage, such as a battery or a rechargeable battery, to provide power to the processor, memory, or other components.

The range finder and the non-visual sensual signal generator communicate with the processor. The communication may be achieved using any means of communication between electronic components. The communication may be across a wire or wireless. Wireless communication may be achieved using any wireless communication protocol known in the art, including, for example, LTE (Cat 0, 1, or 3), LTE-M1, NB-IoT, 5G, NFC, RFID, SigFox, LoRaWAN, Ingenu, Weightless-N, Weightless-P, Weightless-W, ANT, AND+, DigiMesh, MiWi, EnOcean, Dash7, WirelessHART, WiFi, WirelessHD, WiGig, Z-wave, Zigbee, Bluetooth, BLE (Bluetooth Low Energy), 6LoWPAN, Thread, WiFi-ah, GSM, etc. Information Communication Technology (ICT)

In some aspects, the processor and/or memory is integrated with the range finder. In some aspects, the processor and/or memory is integrated with the non-visual sensual signal generator. In some aspects, the processor and/or memory are independent of either the range finder or non-visual sensual signal generator.

In some aspects, the output from more than one range finder is translated into commands to produce non-visible sensual signals by a single processor. In some aspects, the system includes more than one processor, where the first processor is configured receive the output from a first range finder and the second or subsequent processor is configured to receive output from a second or subsequent range finder and issue a command to a non-visible sensual signal generator to produce a non-visible sensual signal representing the output from the second or subsequent range finder. For example, in some aspects, the output from each range finder is processed by a different processor. In other aspects, the output from two or more range finders may be processed by a single processor, while the output from other ranger finders are processed by separate processors.

In some aspects, the processor is portable or wearable. This means the processor is small enough and light enough to be worn or passively carried by the user at any suitable location on the user's body. Like the other components of the system, the processor may be incorporated into an article of clothing or other worn or carried item. The processor may be incorporated into an article along with one or more of the other components of the system, or may be a separate article. The processor may also be incorporated into or carried within a bag, backpack, belt pouch, or any other worn or carried item.

In some aspects, the system is portable, meaning that the weight and dimensions of the system, each part individually and the entire system collectively, are sufficiently small that the system may be carried by a person of average size. In some aspects, the total weight of the system is less than about 5 kg, less than about 3 kg, less than about 1 kg, or less than about 500 g.

Camera and Image Recognition

In some aspects, the system includes a camera. The camera may be, for example, a digital camera. In some aspects, the camera is in communication with the same processor that communicates with the range finder, or the system may include a separate processor and memory for processing signals from the camera. In some aspects, the camera communicates with the same processor that communicates with the range finder and also with a separate processor.

In some aspects, the camera is configured to take an image of the environment in the same direction measured by the range finder. In such aspects, the camera augments the range-finding function of the system by providing additional information about an object in addition to the distance between the user and the object provided by the range finder. The camera does not replace the range finder.

In aspects of the system containing a camera, the processor is configured to perform image recognition on an image obtained by the camera. Image recognition includes object recognition (identifying objects in the image), facial recognition (identifying faces in the image), or text recognition (identifying text in the image). Any image recognition algorithm, such as TensorFlow Object Recognition, or Cloud Vision API (both developed by GOOGLE), may be used. Similarly, any text recognition algorithms, such as optical character recognition may be used. Similarly, any available facial recognition technology may be used. Applications utilizing machine learning or deep learning algorithms may be used to improve and optimize the image recognition features of the system over time. For example, GOOGLE's ML Kit incorporates machine learning-based image recognition, text recognition, and facial detection in one software package.

In aspects of the system using image recognition, facial recognition, or text recognition, the system may also include a non-visual signal generator to produce a non-visual display of the image, face, or text recognized. For example, if the image recognition, facial recognition, or text recognition algorithm produces a text-based result, text-to-speech software may be used to convert the visual text to audible speech to be conveyed to the user.

For example, a small camera may be used and connected to a button and a processor, such as a microcomputer running Raspberry Pi. The button triggers the camera to take an image, which is then sent to the processor. Pre-trained neural networks may be installed on the processor. When an image is sent to the processor, the neural networks identify the objects and/or text present in the photo. Once objects or text are identified, the processor can readback the name of the object and/or text through a connected speaker or headphones.

In some aspects, the processor that performs object recognition, face recognition, and text recognition may utilize machine learning, such as deep learning networks or neural networks. Such a system may be incorporated into the system using the following steps.

Figure 10:
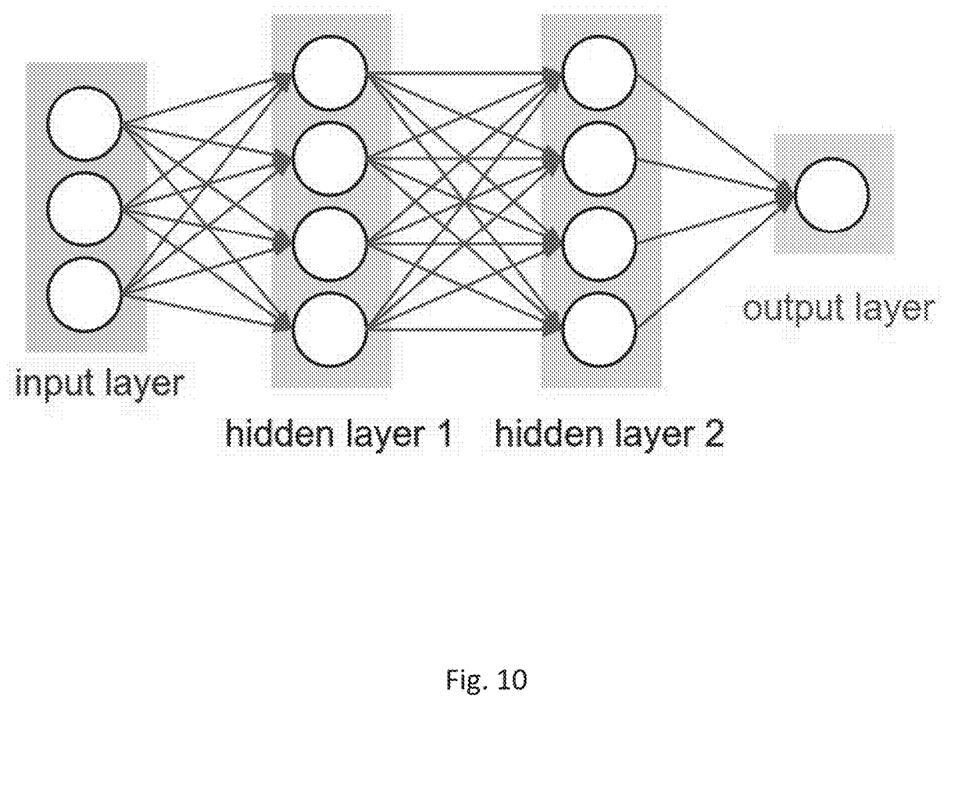
FIG. 10 shows the basic structure of a neural network used for machine learning algorithms.

Step 1: The structure of the neural network will be decided. The basic structure of a potential neural network used in machine learning algorithms is illustrated in FIG. 10. The input amounts, hidden layers and structure will be defined. For example, the neural network could be built upon systems such as GOOGLE's Tensorflow.

Step 2: Acquire a data set made up of images for different common objects to train the neural network. For example, publicly available datasets, such as ImageNet, may be used.

Step 3: Set up the structure for the neural network. Code all the components, including the input nodes, the hidden layers, and the output. The weights that connect each hidden layer together should remain randomly set at first.

Step 4: The images will be input into the neural network, and pass through the nodes to give an output. At this point, because the network has not been trained yet, the output will be inconclusive.

Step 5: While the output from the current network is inconclusive, the anticipated output is known for each image. The error between the network's output and the expected output can be calculated. Using the back propagation method, the weights of that network are tuned so that the error of the output is minimized.

Step 6: More images of the objects will be fed into the network and each of the weights will continue to be fine-tuned so that the network becomes more accurate (i.e., error is minimized to an acceptable level).

Step 7: Test to see if the system is functional. A dataset of images that are different from the images used to train the network will be input as a testing set. If the network does not accurately predict the output, more training data will be used to fine-tune the network. If the network passes the test, then it is complete.

Step 8: Steps 1-7 will be repeated, this time creating a new deep learning network that is tuned to recognize text and words. Images of words are inputted into the network, and the network is finetuned to accurately identify the words.

Step 9: The finished system will be tested once more by having the glasses module take photos of each object that was used in the data set to verify that the algorithm is working properly. If not the case, then the network needs to be fine-tuned using more training and updated until it is accurate.

Operation

Figure 1:
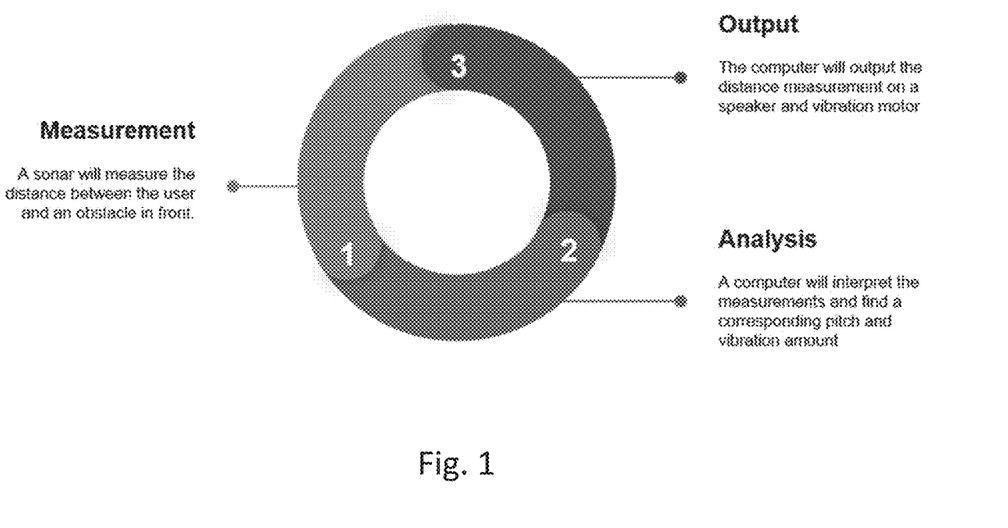
FIG. 1 shows a diagrammatic representation of the operation of one embodiment of the system.

FIG. 1 shows a diagrammatic representation of the operation of one aspect of the system. As shown in FIG. 1, the embodiment illustrated therein operates by measuring the distance between the user and an obstacle. In the embodiment shown in FIG. 1, the system uses sonar to measure the distance between the user and an obstacle in front of the user. Then, a processor interprets the measurements and finds the corresponding non-visual sensual signal. In the embodiment shown in FIG. 1, the system uses a computer to interpret the measurements and correlates those measurements to a pitch and vibration. Finally, the processor issues a command to output the non-visual sensual signal. As shown in the embodiment of FIG. 1, the computer produces the output on both a speaker and vibration motor.

The present invention may be embodied in other specific forms without departing from the spirit or essential attributes thereof. Thus, the above embodiments should not be considered limiting. Any and all embodiments of the present invention may be taken in conjunction with any other embodiment or embodiments to describe additional embodiments. Each individual element of the embodiments is its own independent embodiment. Furthermore, any element of an embodiment is meant to be combined with any and all other elements from any embodiment to describe an additional embodiment. In addition, the present invention encompasses combinations of different embodiments, parts of embodiments, definitions, descriptions and examples of the invention noted herein.

EXAMPLES

Example 1

A prototype was built with a sonar on a pair of glasses to convey sounds to represent the distance being shown on the sonar. This provides obstacle information for eye level obstacles.

The sonar was connected to an Arduino chip (microcomputer) and power was sent to the sonar (from a battery, via an arduino) to display the distance between the sonar and an obstacle in front of it. A mini speaker (piezzo buzzer) was attached to the Arduino. The sonar data in the Arduino will be interpreted and a spectrum made to give off sounds that reflect the measurements shown in the sonar.

The sonar was placed on a wooden rod at different angles. The angles were 90°, 75° and 105° (sonar measures 15° in one direction). The optimal angle was found by drawing the angles geometrically and selecting the angle with the most practical viewing range.

The sonar was attached to a pair of glasses by hot glue and placed in the optimal viewing angle to create a portable test device.

The Arduino module was made portable by extending the connecting wires and keeping them in a protected rig inside a belt pouch, so the sonar rig worn on the head is connected by a wire to the belt pouch. The sensors were attached to the central arduino unit. The speakers were inside the pouch.

This example module was tested under different conditions (night, day) and in different settings (open and closed spaces, many obstacles and very few obstacles), to see if the sound is represented correctly. Briefly, a blindfolded user wore the test device. The user attempted to walk around the hallways of their house using no additional assistance except the device itself. This test was performed several times throughout the development of the device, to evaluate the effect of any modifications made during development.

Example 2

A system was built with two sonars on a pair of shoes that convey vibration to represent the distance measured on the sonar. This provides obstacle information for ground level objects. The two sonars were connected to an Arduino board coded to display distance on a serial port on the computer. The sonar data in the Arduino was interpreted and a spectrum developed to display different levels of vibration that reflects the measurements shown on the sonars.

Two accelerometers were connected to the Arduino and coded to display acceleration on a serial port.

Two rigs were constructed to fit on top of a shoe with spaces for the sensor attachments. One sonar was attached to each rig using hot glue. An accelerometer was also attached to each rig using hot glue.

Each sensor was connected to the central Arduino unit and each rig was attached to a shoe.

A code was written for the Arduino that determines when there is movement in one shoe using the reading from the accelerometer and cancels out the measurement from the sonar in that shoe. This prevents skewed data from being collected because when a person takes a step, their foot points towards the sky.

A code was written for the Arduino to combine the measurements from both sonars on the feet, and find the average between them to give the final distance of any ground object in the field of the vision from the shoe.

The Arduino module was made portable by extending wires and keeping them in a protected rig inside a belt pouch. The vibration motor was inside the pouch. The Arduino module was kept in the pouch, while the two shoe rigs are connected to the Arduino by wires.

This system was tested under different conditions (night, day) and in different settings (open and closed spaces, many obstacles or very few), to see if the vibrations were represented correctly. Briefly, a blindfolded user wore a test device with both glasses and shoes. The user attempted to walk around the hallways of their house using no additional assistance except the device itself. This test was performed several times throughout the development of the device, whenever modifications were made to the device to evaluate the effect of the modification.

The invention claimed is:

1. A system comprising:
   a first range finder mounted on a swivel or servo motor;
   a first non-visible sensual signal generator;
   an orientation sensor;
   a camera; and
   at least one processor,
   wherein the system is wearable, and
   wherein the at least one processor is configured to receive an output from the first range finder and issue a command to the first non-visible sensual signal generator to produce a non-visible sensual signal representing the output from the first range finder, and
   the at least one processor is further configured to receive an output image from the camera, perform image recognition on the image, and produce a non-visible sensual signal representing the output of the image recognition;
   the at least one processor is further configured to receive a signal from the orientation sensor and configured to disregard readings from the range finder or calculate the true horizontal distance when a ranger finder is pointing in the wrong direction.

2. The system of claim 1, wherein the first range finder is a sonar.

3. The system of claim 1, wherein the non-visible sensual signal generator is an audible signal generator.

4. The system of claim 1, wherein the non-visible sensual signal generator is a tactile signal generator.

5. The system of claim 1, wherein the first range finder is incorporated into an article of clothing.

6. The system of claim 5, wherein the article of clothing is headwear or footwear.

7. The system of claim 1, further comprising a second range finder separated from the first range finder by a distance of at least 24 inches wherein the at least one processor is further configured to receive an output from the second range finder and issue a command to a non-visible sensual signal generator to produce a non-visible sensual signal representing the output from the second range finder.

8. The system of claim 7, wherein the at least one processor includes at least a first processor and a second processor, wherein the first processor is configured to receive the output from the first range finder and the second processor is configured to receive the output from the second range finder and issue a command to a non-visible sensual signal generator to produce a non-visible sensual signal representing the output from the second range finder.

9. The system of claim 7, further comprising a second non-visible sensual signal generator that receives the command from the second processor.

10. The system of claim 7, wherein the first and second range finder are both sonar.

11. The system of claim 7, wherein one range finder is configured to be mounted on a pair of eyeglasses and the other range finder is configured to be mounted on a shoe.

12. The system of claim 9, wherein the first non-visible sensual signal generator is an audible signal generator.

13. The system of claim 9, wherein the first non-visible sensual signal generator is a tactile signal generator.

14. The system of claim 9, wherein the first non-visible sensual signal generator is an audible signal generator and the second non-visible sensual signal generator is a tactile signal generator.

15. The system of claim 1, wherein the image recognition includes object recognition, facial recognition, or text recognition.

16. The system of claim 1, further comprising a speaker, wherein the processor is configured to issue commands to the speaker to emit an audible display of the object, face, or text recognized by the system.

17. The system of claim 1, comprising two or more processors wherein the first processor is configured to receive the output from the range finder and issue a command to the non-visible sensual signal generator to produce a non-visible sensual signal representing the output from the range finder and the second processor is configured to receive the output image from the camera, perform image recognition on the image, and produce a non-visible sensual signal representing the output of the image recognition.

18. The portable system of claim 17, wherein the second processor is configured to use machine learning to perform object recognition, facial recognition, or text recognition on the images from the camera.

19. A system comprising:
a first range finder;
a first non-visible sensual signal generator;
a camera; and
at least one processor,
wherein the system is wearable, and
wherein the at least one processor is configured to receive an output from the first range finder and issue a command to the first non-visible sensual signal generator to produce a non-visible sensual signal representing the output from the first range finder,
the processor correlates the output of the first range finder to the duration of the non-visible sensual signal; and
the rate of change in the non-visual sensual signal is higher for objects that are closer, and
the at least one processor is further configured to receive an output image from the camera, perform image recognition on the image, and produce a non-visible sensual signal representing the output of the image recognition.

20. A system comprising:
a first range finder mounted on a swivel or servo motor;
a first non-visible sensual signal generator;
an orientation sensor;
a camera; and
at least one processor,
wherein the system is wearable, and
wherein the at least one processor is configured to receive an output from the first range finder and issue a command to the first non-visible sensual signal generator to produce a non-visible sensual signal representing the output from the first range finder,
the processor correlates the output of the first range finder to the duration of the non-visible sensual signal; and
the rate of change in the non-visual sensual signal is higher for objects that are closer, and
the at least one processor is further configured to receive an output image from the camera, perform image recognition on the image, and produce a non-visible sensual signal representing the output of the image recognition; and
the at least one processor is further configured to receive a signal from the orientation sensor and configured to disregard readings from the range finder or calculate the true horizontal distance when a ranger finder is pointing in the wrong direction.

* * * * *